(12) United States Patent
De La Bruere Terreault et al.

(10) Patent No.: US 10,865,653 B2
(45) Date of Patent: Dec. 15, 2020

(54) MAGNETIC SEAL SYSTEM

(71) Applicant: PRATT & WHITNEY CANADA CORP., Longueuil (CA)

(72) Inventors: Julien De La Bruere Terreault, Ste-Anne-de-Sorel (CA); Dany Blais, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 461 days.

(21) Appl. No.: 15/074,082

(22) Filed: Mar. 18, 2016

(65) Prior Publication Data

US 2017/0268360 A1    Sep. 21, 2017

(51) Int. Cl.
| | |
|---|---|
| *F01D 11/00* | (2006.01) |
| *F16J 15/54* | (2006.01) |
| *F02C 3/04* | (2006.01) |
| *F02C 7/28* | (2006.01) |
| *F01D 25/18* | (2006.01) |

(52) U.S. Cl.
CPC .......... *F01D 11/005* (2013.01); *F01D 25/183* (2013.01); *F02C 3/04* (2013.01); *F02C 7/28* (2013.01); *F16J 15/54* (2013.01); *F05D 2220/32* (2013.01); *F05D 2240/55* (2013.01); *F05D 2240/60* (2013.01)

(58) Field of Classification Search
CPC ........ F01D 11/005; F01D 25/183; F02C 7/28; F16J 15/54; F05D 2240/55; F05D 2240/60
See application file for complete search history.

(56) References Cited

U.S. PATENT DOCUMENTS

| | | | | | |
|---|---|---|---|---|---|
| 2,944,843 | A | * | 7/1960 | Colby | ............ F16J 15/38 277/384 |
| 3,050,319 | A | * | 8/1962 | Colby | ............ F16J 15/38 277/374 |
| 3,612,549 | A | * | 10/1971 | Berkowitz | ............ F16J 15/43 277/410 |
| 3,926,443 | A | * | 12/1975 | Fenerty | ............ F16J 15/3496 277/405 |

(Continued)

FOREIGN PATENT DOCUMENTS

| | | |
|---|---|---|
| GB | 678981 A | 9/1952 |
| GB | 826899 A | 1/1960 |

*Primary Examiner* — Carlos A Rivera
(74) *Attorney, Agent, or Firm* — Norton Rose Fulbright Canada LLP

(57) ABSTRACT

A magnetic seal system adapted for use between a support structure and a rotatable shaft. The seal system includes a rotating annular seal assembly surrounding the shaft and rotating therewith, which includes an annular seal, and a non-rotating biasing assembly sealingly mounted to the support structure around the shaft and axially engaging the annular seal assembly. The biasing assembly includes an annular magnet unit axially displaceable relative to the shaft and supported surrounding the shaft. The annular magnet unit exerting an attracting force on the annular seal assembly to biasingly displace the annular magnet unit towards the annular seal. A bias member unit is also provided for non-magnetically biasing the annular magnet unit axially relative to the shaft towards the annular seal. Adjacent contacting surfaces between the annular seal and the annular magnet unit biasingly contact one another to form a sealing interface therebetween.

16 Claims, 2 Drawing Sheets

(56) References Cited

U.S. PATENT DOCUMENTS

| | | | | |
|---|---|---|---|---|
| 5,078,411 A | * | 1/1992 | Geco | F16J 15/3444 |
| | | | | 277/378 |
| 5,730,447 A | * | 3/1998 | Dawson | F16J 15/3444 |
| | | | | 277/378 |
| 6,142,477 A | * | 11/2000 | Meinzer | F01D 11/16 |
| | | | | 277/378 |
| 8,038,155 B2 | * | 10/2011 | Zheng | F16J 15/3444 |
| | | | | 277/302 |
| 8,201,830 B2 | * | 6/2012 | Nobrega | F16J 15/348 |
| | | | | 277/345 |
| 8,474,826 B2 | * | 7/2013 | Villeneuve | F16J 15/3444 |
| | | | | 277/377 |
| 2006/0244221 A1 | * | 11/2006 | Villeneuve | F16J 15/3412 |
| | | | | 277/410 |
| 2010/0264597 A1 | * | 10/2010 | Sato | F16J 15/3488 |
| | | | | 277/358 |
| 2014/0154053 A1 | * | 6/2014 | Roberts | F01D 11/00 |
| | | | | 415/121.3 |
| 2014/0265142 A1 | * | 9/2014 | Tissakht | F16J 15/3444 |
| | | | | 277/358 |
| 2016/0061331 A1 | * | 3/2016 | Taylor | F16J 15/344 |
| | | | | 277/306 |
| 2017/0211704 A1 | * | 7/2017 | De La Bruere Terreault | |
| | | | | F16J 15/162 |
| 2017/0248026 A1 | * | 8/2017 | De La Bruere Terreault | |
| | | | | F01D 1/003 |

\* cited by examiner

MAGNETIC SEAL SYSTEM

TECHNICAL FIELD

The application relates generally to magnetic seals of the type used to seal a rotating shaft.

BACKGROUND OF THE ART

Magnetic seals may be used for sealing compartments in rotating systems like gas turbine engines. These magnetic seals can include a magnet and a seal mounted on a shaft. In some instances, a high magnetic attraction between the magnet and the seal may be required to maintain the sealing integrity of the magnetic seal. Therefore, to provide a rotary seal in such magnetic seals, a preformed packing of the seal is required to transmit rotating motion between the shaft and seal. The preformed packing can require a higher than normal amount of packing squeeze to prevent slippage between the seal and the shaft which can result in a difficult installation as well as variability in the face load of the carbon seal. A high packing squeeze can also prevent the seal from properly tracking axial movements of the shaft. Room for improvement exists.

SUMMARY

In one aspect, there is provided a magnetic seal system adapted for use between a support structure and a rotatable shaft, the seal system comprising a rotating annular seal assembly configured to be surrounding the shaft to rotate therewith, the annular seal assembly including an annular seal; and a non-rotating biasing assembly configured to be sealingly mounted to the support structure around the shaft and axially engaging the annular seal assembly, the biasing assembly including an annular magnet unit configured to be axially displaceable relative to the shaft and to be supported surrounding the shaft, the annular magnet unit exerting an attracting force on the annular seal assembly to biasingly displace the annular magnet unit towards the annular seal, and a bias member unit non-magnetically biasing the annular magnet unit axially relative to the shaft towards the annular seal, wherein adjacent contacting surfaces between the annular seal and the annular magnet unit biasingly contact one another to form a sealing interface therebetween.

In another aspect, there is provided an engine assembly comprising an engine core including at least one internal combustion engine; a rotatable shaft operatively engaged with the engine core; a support structure mounted around the shaft, the support structure housing at least a section of the shaft; a magnetic seal system connected to the support structure, the magnetic seal system including a rotating annular seal assembly surrounding the shaft to rotate therewith, the annular seal assembly including an annular seal; and a non-rotating biasing assembly sealingly mounted to the support structure around the shaft and axially engaging the annular seal assembly, the biasing assembly including an annular magnet unit configured to be axially displaceable relative to the shaft and to be supported surrounding the shaft, the annular magnet unit exerting an attracting force on the annular seal assembly to biasingly displace the annular magnet unit towards the annular seal, and a bias member unit non-magnetically biasing the annular magnet unit axially relative to the shaft towards the annular seal, wherein adjacent contacting surfaces between the annular seal and the annular magnet unit biasingly contact one another to form a sealing interface therebetween.

In a further aspect, there is provided a method of sealing a space surrounding a rotatable shaft mounted within a support structure and including an annular seal assembly and an annular magnet unit, the method comprising magnetically biasing the annular magnet unit towards an annular seal via an attracting force between the annular seal assembly and the annular magnet unit; non-magnetically biasing the annular magnet unit towards the annular seal via a bias force produced by a bias member unit; and sealing adjacent contacting surfaces between the annular magnet unit and the annular seal.

DESCRIPTION OF THE DRAWINGS

Reference is now made to the accompanying figures in which.

DETAILED DESCRIPTION

Figure 1:
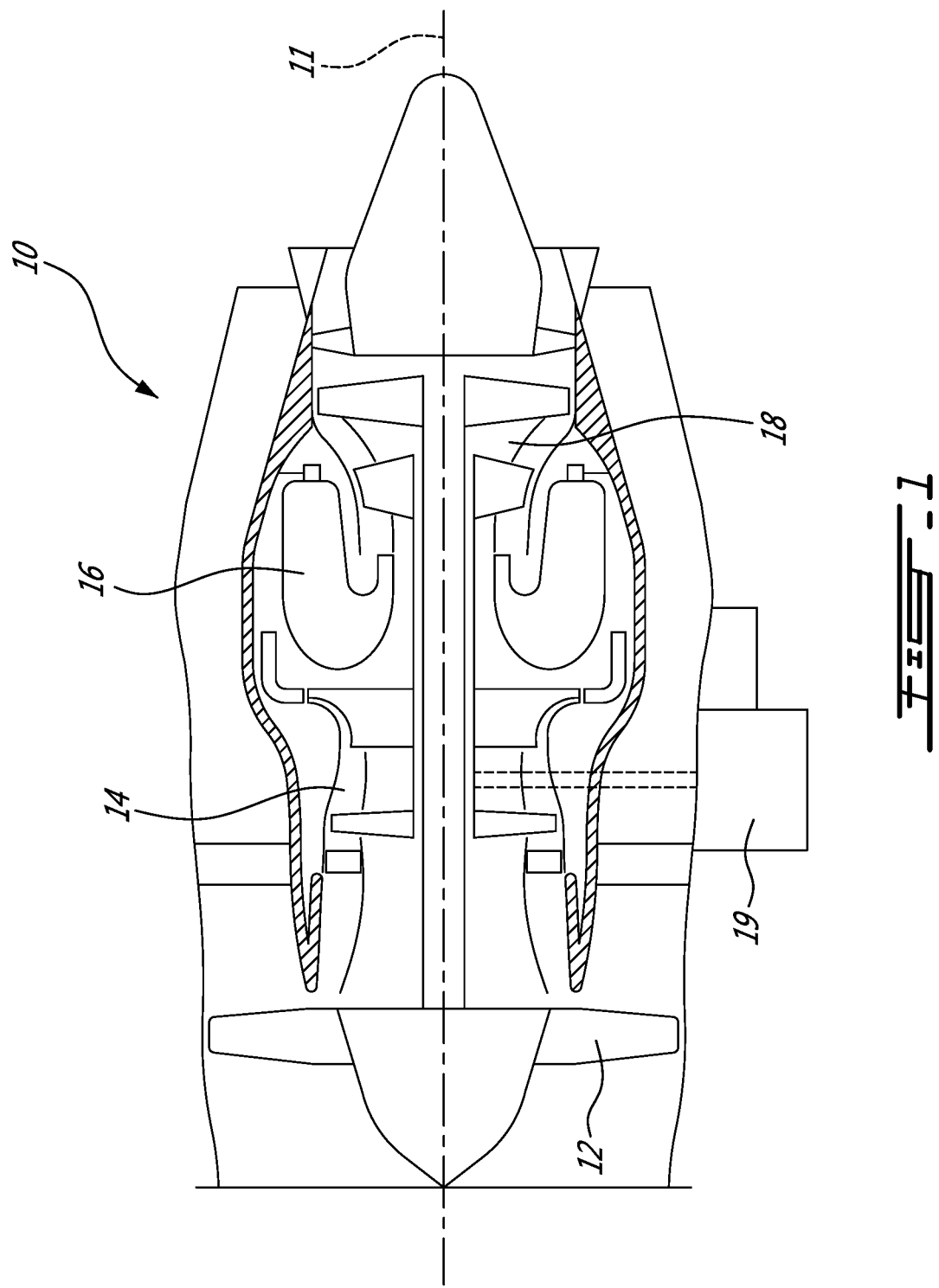
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. An accessory gearbox 19 may be driven by either one of the compressor 14 and the turbine section 18.

Figure 2:
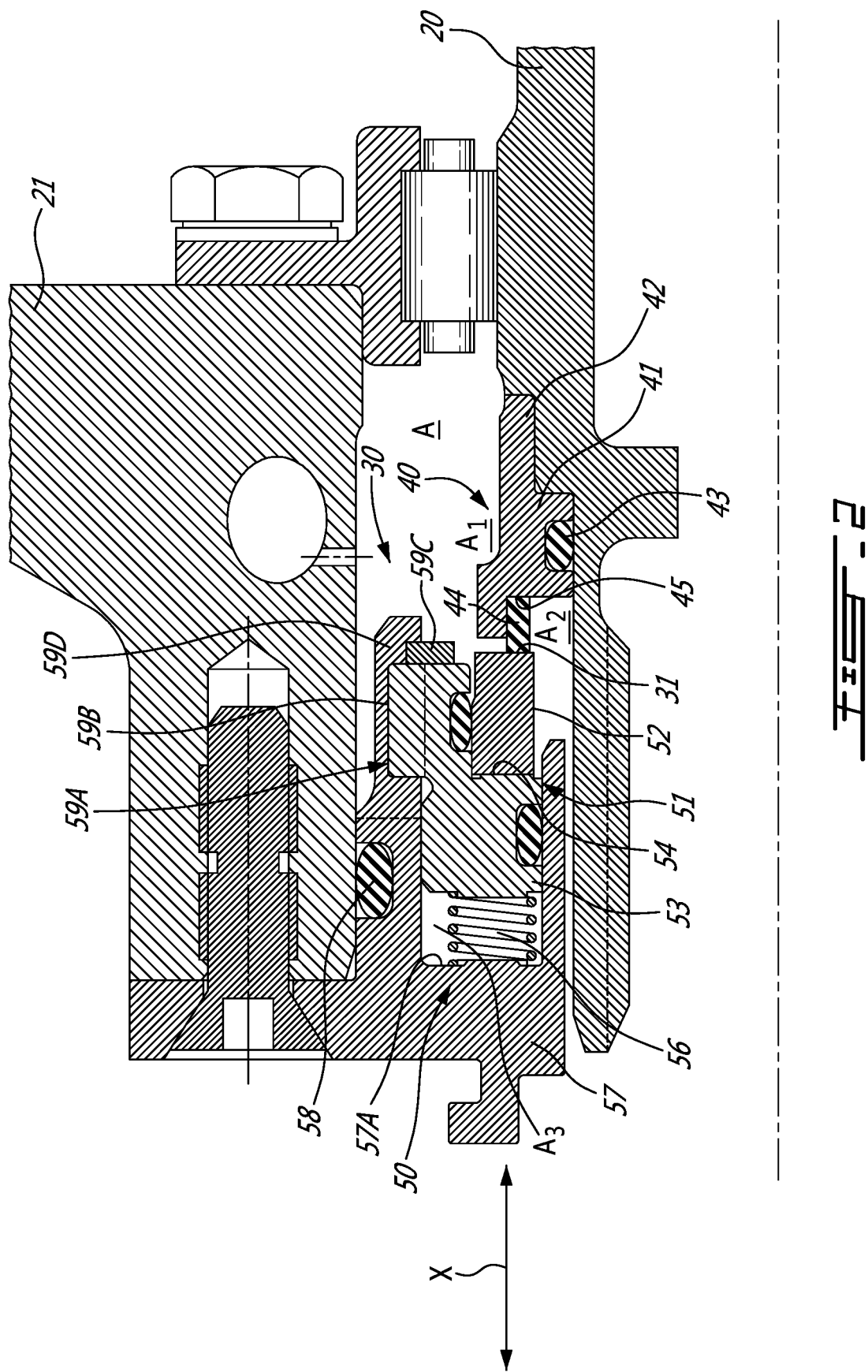
FIG. 2 is a schematic sectional view of a magnetic seal system in accordance with an embodiment of the present disclosure.

Referring to FIG. 2, a magnetic seal system in accordance with the present disclosure is generally shown at 30, for instance of the type used in the accessory gearbox 19 (FIG. 1) of the gas turbine engine 10 (FIG. 1). It is also contemplated to use the magnetic seal system 30 in other applications as well. For example, the magnetic seal system 30 can be used as an output shaft seal on a turboshaft and turboprop engines, as well as a bearing cavity seal on engine mainshafts. The magnetic seal system 30 is used to seal a space A between a shaft 20 and a support structure 21 (i.e., a structure of the apparatus using the magnetic seal system 30, a housing thereof, etc), to block fluid passage through the space A by forming a sealing interface 31. In the illustrated embodiment, the space A is an annular space. The support structure 21 can be any rigid housing or casing surrounding the shaft 20 and enclosing the space A. In a particular embodiment, the support structure 21 houses a section or a portion of the shaft 20. Alternately, the support structure 21 substantially houses the shaft 20.

The magnetic seal system 30 includes a rotating annular seal assembly 40 and a non-rotating biasing assembly 50. For better clarity, elements relating to, or forming part of, the annular seal assembly 40 are referenced by numerals ranging between forty and fifty, whereas elements relating to, or forming part of, the non-rotating biasing assembly 50 are referenced by numerals ranging between fifty and sixty.

In the particular embodiment shown in FIG. 2, the non-rotating biasing assembly 50 is displaced towards the rotating annular seal assembly 40 to form the sealing interface 31 between the two assemblies 40, 50, thereby sealing the space A into two sealingly adjacent spaces A1, A2.

The rotating annular seal assembly 40 includes an annular member 41. The annular member 41 typically consists of a structurally rigid material with a ferromagnetic content, such as a metal. The annular member 41 is mounted to the shaft 20 to rotate therewith via a connector 42. The connector 42 blocks a relative rotation between the annular member 41 and the shaft 20. The connector 42 may also limit or block axial displacement of the annular seal assembly 40 along the shaft 20, for example, via one or more shoulders positioned along the shaft 20 to block the displacement of the annular seal assembly 40. The connector 42 shown is an interlocking engagement between a protrusion of the annular member 41 and the shaft 20. Other connector configurations are also possible.

A seal 43 is provided to seal off an interface between the annular member 41 and the shaft 20. For instance, the seal 43 may be an O-ring, a gasket, etc, made of a material capable of withstanding the pressures and temperatures in the apparatus and/or ambient environment. Moreover, the material must be resistant to the nature of ambient fluids (e.g., oil).

The rotating annular seal assembly 40 also includes an annular seal 44 disposed adjacent to the annular member 41. The annular seal 44 is connected to the annular member 41 to rotate therewith. In the embodiment shown, the annular member 41 defines a shoulder 45 that is configured to receive thereon the annular seal 44. The shoulder 45 provides a pair of abutment surfaces for receiving the annular seal 44 to strengthen the connection between the annular seal 44 and the annular member 41 and to cause concurrent rotation between the annular seal 44 and the annular member 41. Other arrangements are contemplated, such as an annular groove formed in the annular member 41 to accommodate a portion of the annular seal 44. The annular seal 44 is made of a material that will wear off gradually, while forming a contact surface conforming to the component it will rub against, to create the dynamic seal interface 31. For example, the annular seal 44 is made of carbon, or equivalent.

The non-rotating biasing assembly 50 is sealingly mounted to the support structure 21 around the shaft 20. The non-rotating biasing assembly 50 includes an annular magnet unit 51 that can move axially in a direction X parallel or substantially parallel to the rotational axis of the shaft 20. The annular magnet unit 51 can include one or more discrete annular magnets. In the illustrated embodiment, the annular magnet unit 51 includes one annular magnet 52. The annular magnet 52 exerts an attracting force with respect to the annular member 41, such that the annular magnet unit 51 is drawn toward the annular member 41, as the annular magnet unit 51 is movable in the direction X. Although the annular magnet 52 is illustrated as a single monolithic magnet, numerous other arrangements are considered. For example, the annular magnet 52 may be constituted of a non-magnetic annular body supporting a plurality of discrete magnets, among other possibilities. The expression "annular magnet" encompasses this arrangement of discrete magnets in a support body, along with other arrangements.

In the illustrated embodiment, the annular magnet unit 51 may include a carrier 53. The carrier 53 is a non-magnetic annular body supporting the annular magnet 52. The carrier 53 defines a seat 54 for receiving the annular magnet 52. A seal 55 is provided to seal off an interface between the annular magnet 52 and the carrier 53. For instance, the seal 55 may be an O-ring, a gasket, etc, made of a material capable of withstanding the pressures and temperatures in the apparatus and/or ambient environment.

The non-rotating biasing assembly 50 also include a bias member unit 56 mounted to an annular housing 57. In the illustrated embodiment, the bias member unit 56 is a spring mounted between the annular magnet unit 51 and an inner wall 57A of the annular housing 57. The bias member unit 56 can be any other device that can apply a force to its surrounding, for example a bellow, a tension spring, a pneumatic, hydraulic and/or electrical telescoping member or any equivalent thereof. The bias member unit 56 is positioned so that it displaces the annular magnet unit 51 away from the inner wall 57A of the annular housing 57 towards the rotating annular seal assembly 40. Other configurations of the bias member unit 56 are possible. The bias member unit 56 cooperates with the carrier 53 for biasing the annular magnet unit 51 towards the rotating annular seal assembly 40.

In an alternative embodiment, the bias member unit 56 can include a bellow covering the spring and sealing an interface between the bias member unit 56 and a radially inner surface of the annular housing 57. In yet another alternative embodiment, the bias member unit 56 includes a series of discrete bias elements, such as discrete springs, radially mounted on the inner wall 57A and engaging the annular magnet unit 51. In yet another alternative embodiment, a space A3 can be pressurized by fluid to bias the annular magnet unit 51 towards the rotating annular seal assembly 40.

The annular housing 57 is sealingly mounted to the support structure 21 in a non-contacting relationship around the shaft 20 and defining the annular space A3. The annular housing 57 houses the annular magnet unit 51 and the bias member unit 56, and can be removed together with both units 51, 56 from the support structure 21. A seal 58 is provided to seal off an interface between the annular housing 57 and the support structure 21. For instance, the seal 58 may be an O-ring, a gasket, etc, made of a material capable of withstanding the pressures and temperatures in the apparatus and/or ambient environment. Moreover, the material must be resistant to the nature of ambient fluids (e.g., oil).

Still referring to FIG. 2, the annular housing unit 51 includes a slot 59A on a radially outer surface of the annular space A3. A protrusion 59B of the annular magnet unit 51 is received within the slot 59A preventing relative rotation between the annular magnet unit 51 and the annular housing 57. The protrusion 59B can be shaped and sized to snugly fit within the slot 59A while still allowing an axial movement of the protrusion 59B within the slot 59A. The contact surfaces between the protrusion 59B and the slot 59A can be lubricated to reduce friction between them. This is one of numerous anti-rotation features contemplated.

A retaining ring 59C is mounted to an end 59D of the annular housing 57. The end 59D defines a shoulder that receives the retaining ring 59C in a fixed position relative to the annular housing 57. The retaining ring 59C axially blocks the displacement of the annular magnet unit 51 upon contact between the annular magnet unit 51 and the retaining ring 59C. The retaining ring 59C also retains the annular magnet unit 51 and/or the bias member unit 56 within, or partially within, the annular housing 57. Advantageously, the non-rotating biasing assembly 50 can be transported as a single unit retained within the annular housing 57.

In use, the displaceable annular magnet unit 51 attracts the stationary annular member 41. The attraction force biases the annular magnet unit 51 towards and against the annular seal 44 thereby forming the sealing interface 31. The bias member unit 56 also biases, as illustrated through compression load, the annular magnet unit 51 towards and against the annular seal 44 thereby forming the sealing interface 31. The annular contact interface between the annular seal 44 and a lateral surface of the annular magnet 52 is therefore the sealing interface 31. The sealing interface 31 blocks fluid from passing through the space A, such as from space A1 to space A2, or vice versa. Advantageously, the sealing interface 31 is achieved via cooperation and combination of both magnetic attraction load and non-magnetic load.

Although a configuration including the effect of gravity alone as a non-magnetic biasing force may be contemplated, it may not be useful nor practical. This configuration can be achieved, for example, when the magnetic seal system 30 is inclined such that a weight of the annular magnetic unit 51 biases the annular magnetic unit 51 towards the annular seal 44. However, the configuration based on gravitational force alone is not effective, at least, when the magnetic seal system 30 is placed in a horizontal or substantially horizontal plane, or if the inclination of the magnetic seal system 30 is such that the weight of the annular magnetic unit 51 biases the annular magnetic unit 51 away from the annular seal 44.

Accordingly, in a particular embodiment, the magnetic seal system 30 is used for magnetically biasing the annular magnet unit 51 towards the annular seal 44 via an attracting force between the annular seal assembly 40 and the annular magnet unit 51, non-magnetically biasing the annular magnet unit 51 towards the annular seal 44 via a bias force produced by the bias member unit 56, and sealing adjacent contacting surfaces between the annular magnet unit 51 and the annular seal 44. The magnetic seal system 30 is also used for axially blocking the displacement of the annular magnet unit 51 upon contact between the annular magnet unit 51 and the retaining ring 59C and receiving the protrusion 59B of the annular magnet unit 51 into the annular housing 57 for blocking a rotation of the annular magnet unit 51 around the shaft 20.

In the embodiment shown, non-magnetically biasing the annular magnet unit 51 includes mechanically biasing the annular magnet unit 51 towards the annular seal 44 via a spring 56.

In an alternative embodiment, non-magnetically biasing the annular magnet unit 51 includes using fluid pressure to cause the annular magnet unit 51 to displace towards the annular seal 44.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A magnetic seal system adapted for use between a support structure and a rotatable shaft, the seal system comprising:
    a rotating annular seal assembly configured to be surrounding the shaft to rotate therewith, the annular seal assembly including an annular seal, the annular seal being made from a wearable material gradually wearing off from rubbing contact with another component; and
    a non-rotating biasing assembly configured to be sealingly mounted to the support structure around the shaft and axially engaging the annular seal assembly, the biasing assembly including:
        an annular magnet unit configured to be axially displaceable relative to the shaft and to be supported surrounding the shaft, the annular magnet unit exerting an attracting force on the annular seal assembly to biasingly displace the annular magnet unit towards the annular seal for rubbing contact during rotation of the rotating annular seal assembly, and
        a bias member unit non-magnetically biasing the annular magnet unit axially relative to the shaft towards the annular seal, wherein adjacent contacting surfaces between the annular seal and the annular magnet unit biasingly contact one another to form a sealing interface therebetween in which the wearing off of the annular seal during rotation of the rotating annular seal assembly conforms the contacting surface of the seal to the contacting surface of the annular magnet unit.

2. The magnetic seal system as defined in claim 1, wherein the annular magnet unit includes a carrier defining a seat for receiving at least one magnet and cooperating with the bias member unit for biasing the annular magnet unit.

3. The magnetic seal system as defined in claim 1, wherein the biasing assembly further comprising an annular housing configured to be mounted to the support structure in a non-contacting relationship around the shaft and defining an annular space for receiving the annular magnet unit, the annular magnet unit axially displaceable within the annular space and the bias member unit mountable to the annular housing.

4. The magnetic seal system as defined in claim 3, wherein the annular housing includes a slot on a radial surface of the annular space receiving a protrusion of the annular magnet unit and blocking relative rotation between the annular magnet unit and the annular housing, the protrusion of the annular magnet unit axially displacing within the slot.

5. The magnetic seal system as defined in claim 3, wherein the annular housing includes a retaining ring mounted to an end of the annular housing and configured to be surrounding the shaft, the retaining ring axially blocking the displacement of the annular magnet unit upon contact between the annular magnet unit and the retaining ring.

6. The magnetic seal system as defined in claim 3, including a bellow disposed in the annular space, the bellow surrounding and covering the bias member unit.

7. The magnetic seal system as defined in claim 1, wherein the bias member unit includes discrete bias elements engaging the annular magnet unit, each bias element cooperating with another one of the bias elements for non-magnetically biasing the annular magnet unit axially towards the annular seal.

8. The magnetic seal system as defined in claim 1, further comprising an anti-rotation feature between the annular magnet unit and the support structure.

9. An engine assembly comprising:
    an engine core including at least one internal combustion engine;
    a rotatable shaft operatively engaged with the engine core;
    a support structure mounted around the shaft, the support structure housing at least a section of the shaft;
    a magnetic seal system connected to the support structure, the magnetic seal system including:
        a rotating annular seal assembly surrounding the shaft to rotate therewith, the annular seal assembly including an annular seal, the annular seal being made from wearable material gradually wearing off from rubbing contact with another component; and
        a non-rotating biasing assembly sealingly mounted to the support structure around the shaft and axially engaging the annular seal assembly, the biasing assembly including:

an annular magnet unit configured to be axially displaceable relative to the shaft and to be supported surrounding the shaft, the annular magnet unit exerting an attracting force on the annular seal assembly to biasingly displace the annular magnet unit towards the annular seal for rubbing contact during rotation of the rotating annular seal assembly, and a bias member unit non-magnetically biasing the annular magnet unit axially relative to the shaft towards the annular seal, wherein adjacent contacting surfaces between the annular seal and the annular magnet unit biasingly contact one another to form a sealing interface therebetween in which the wearing off of the annular seal during rotation of the rotating annular seal assembly conforms the contacting surface of the seal to the contacting surface of the annular magnet unit.

10. The engine assembly as defined in claim 9, wherein the annular magnet unit includes a carrier defining a seat for receiving at least one magnet and cooperating with the bias member unit for biasing the annular magnet unit.

11. The engine assembly as defined in claim 9, wherein the biasing assembly further comprising an annular housing mounted to the support structure in a non-contacting relationship around the shaft and defining an annular space for receiving the annular magnet unit, the annular magnet unit axially displaceable within the annular space and the bias member unit mountable to the annular housing.

12. The engine assembly as defined in claim 11, wherein the annular housing includes a slot on a radial surface of the annular space receiving a protrusion of the annular magnet unit and blocking relative rotation between the annular magnet unit and the annular housing, the protrusion of the annular magnet unit axially displacing within the slot.

13. The engine assembly as defined in claim 11, wherein the annular housing includes a retaining ring mounted to an end of the annular housing and surrounding the shaft, the retaining ring axially blocking the displacement of the annular magnet unit upon contact between the annular magnet unit and the retaining ring.

14. The engine assembly as defined in claim 11, including a bellow disposed in the annular space, the bellow surrounding and covering the bias member unit.

15. The engine assembly as defined in claim 9, wherein the bias member unit includes discrete bias elements engaging the annular magnet unit, each bias element cooperating with another one of the bias elements for non-magnetically biasing the annular magnet unit axially towards the annular seal.

16. The engine assembly as defined in claim 9, wherein the annular seal assembly includes a protrusion interlocked with the shaft for blocking a rotation between the annular seal assembly and the shaft.

* * * * *